(12) United States Patent
Han et al.

(10) Patent No.: US 6,822,214 B2
(45) Date of Patent: Nov. 23, 2004

(54) OPTICAL SIGNAL RECEIVING APPARATUS AND METHOD USING THE SAME

(75) Inventors: Jin-Soo Han, Daejeon (KR); Moo-Jung Chu, Daejeon (KR); Jong-Hyun Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 91 days.

(21) Appl. No.: 10/283,946

(22) Filed: Oct. 30, 2002

(65) Prior Publication Data

US 2003/0122057 A1 Jul. 3, 2003

(30) Foreign Application Priority Data

Dec. 27, 2001 (KR) ......................................... 2001-85837

(51) Int. Cl.[7] .............................................. H01J 40/14
(52) U.S. Cl. ............................. 250/214 R; 250/214 A; 398/208
(58) Field of Search ....................... 250/214 R, 214 A, 250/214 LA, 214 AG, 214 C, 227.11; 398/208, 209, 210; 330/59, 308; 375/317, 345; 327/514

(56) References Cited

U.S. PATENT DOCUMENTS

| | | | |
|---|---|---|---|
| 4,257,126 A | | 3/1981 | Theall, Jr. |
| 5,917,639 A | | 6/1999 | Ushirozawa |
| 6,081,362 A | | 6/2000 | Hatakeyama et al. |
| 6,178,213 B1 | * | 1/2001 | McCormack et al. ....... 375/355 |
| 6,242,732 B1 | | 6/2001 | Rantakari |
| 6,262,411 B1 | | 7/2001 | Chandrasekhar |
| 6,275,959 B1 | | 8/2001 | Ransijn |
| 6,304,357 B1 | * | 10/2001 | Ohhata et al. ............... 398/209 |

FOREIGN PATENT DOCUMENTS

| | | |
|---|---|---|
| KR | 10-0217529 | 6/1999 |
| KR | 10-0249816 | 12/1999 |

OTHER PUBLICATIONS

Phototonics Conference 2001, "Decision Threshold Variation according to the Received Optical Power and Optical Receiver", Oct. 31, 2001, 4 pages.

(List continued on next page.)

Primary Examiner—Kevin Pyo
(74) Attorney, Agent, or Firm—Blakely Sokoloff Taylor & Zafman

(57) ABSTRACT

Provided are an optical signal receiving apparatus whose optimum receiving performance is maintained regardless of a change in the power of an optical signal, and a method using the same. The apparatus includes an optical coupler for dividing an input optical signal at a predetermined ratio to produce first and second divided signals, a photoelectric converter for converting the first divided signal into an electric signal, an amplifier for amplifying the electric signal within a predetermined range centering on a reference voltage, a reference voltage controlling unit for detecting the power of the second divided signal, predicting the power of the first divided signal, and controlling the amplitude of the reference voltage in accordance with the predicted power, and a clock & data recovery unit for recovering a clock signal and data from a signal output from the amplifier. Even if the power of an optical signal changes, the reference voltage of a limiting amplifier, which is best suitable for optimum performance with respect to the power of an input optical signal, can be detected and adjusted using the method and apparatus, thereby maintaining the optimum receiving performance of the optical signal receiving apparatus.

4 Claims, 6 Drawing Sheets

OTHER PUBLICATIONS

IEEE Photonics Technology Letters, vol. 5, No. 3, Mar. 1993, "Margin Measurements in Optical Amplifier Systems", N. Bergano, et al., 3 pages.

IEE Proceedings, vol. 136, Pt. J, No. 3, Jun. 1989, Decision–point steering in optical fibre communication systems; theory, M. Sherif, P. Davies, 8 pages.

IEEE Phototonics Technology Letters, vol. 3, No. 6, Jun. 1991, "Sensitivity of Optically Preamplified Receivers with Optical Filtering", R. Steele, et al., 3 pages.

Journal of Lightwave Technology, vol. 7, No. 7, Jul. 1989, "Lightwave Systems With Optical Amplifiers", N. Olsson, 11 pages.

* cited by examiner (+)V

Vref (=0V)

(−)V

OPTICAL SIGNAL RECEIVING APPARATUS AND METHOD USING THE SAME

CROSS-REFERENCE TO RELATED APPLICATIONS

This application is based upon and claims priority from Korean Patent Application No. 2001-85837, filed Dec. 27, 2001 in the Korean Intellectual Property Office (KIPO), the contents of which are incorporated herein by reference.

BACKGROUND OF THE INVENTION

1. Field of the Invention

The present invention relates to an optical signal receiving apparatus for restoring an optical signal transmitted from an optical transmission system, to the original electric signal, and more particularly, to an optical signal receiving apparatus having an optimum receiving performance regardless of a change in the power of an input optical signal, and a method using the same.

2. Description of the Related Art

FIG. 1 is a block diagram schematically illustrating the structure of a conventional optical signal receiving apparatus. Referring to FIG. 1, the conventional apparatus includes a photodiode 10, an amplifier 12, a limiting amplifier 14, and a clock & data recovery unit 16.

Referring to FIG. 1, the photodiode 10 converts an optical signal INopt into an electric signal through photoelectric conversion. The amplitude of the converted electric signal is feeble and thus amplified by the amplifier 12. However, since the amplitude of the amplified electric signal depends on the power of the original optical signal INopt, the electric signal is not suitable for a signal input to the clock & data recovery unit 16 that requires a signal of a regular amplitude. Thus, the limiting amplifier 14 regularly maintains the amplitude of a signal amplified by the amplifier 12 regardless of a change in the power of an input optical signal INopt, and the clock & data recovery unit 16 restores a clock signal CLOCK and data DATA from a signal output from the limiting amplifier 14.

FIG. 2 is a graph of stochastic distributions of a signal with respect to space(0) and mark(1) when an optical signal is converted into an electric signal. FIG. 3 is a graph of stochastic distributions of a signal with respect to space and mark when bit noise increases due to an increase in the power of an input optical signal.

The graph of FIG. 2 reveals that a probability density function PDF(1) of a signal for mark and a probability density function PDF(0) of a signal for space show regular stochastic distributions. From the graph of FIG. 2, the average and standard deviation of a signal for mark are $V_1$ and $\sigma_1$, and the average and standard deviation of a signal for space are $V_0$ and $\sigma_0$, respectively. If a voltage of a crossing point of these probability density functions PDF(1) and PDF(0) is set as a reference voltage $V_{opt}$ for a limiting amplifier, it is possible to obtain a minimum ratio of bit error when distinguishing between mark and space on the basis of the reference voltage.

In conventional optical signal receiving apparatuses, a reference point for distinguishing between mark and space is fixed to be one reference voltage $V_{opt}$, e.g., 0V. In case that the power of an optical signal is weak, thermal noise and shot noise predominate, and thus, the noise distribution of the signal for mark is almost the same as that of the signal for space. As a result, the voltage of crossing point of the probability density functions PDF(1) and PDF(0) is located at the center of V0 and V1, e.g., 0V. Adversely, if the power of the optical signal is strong, bit noise predominates, and thus the noise of the signal for mark is larger than that of the signal for space. As a result, as shown in FIG. 3, the voltage of crossing point of the probability density functions PDF(1) and PDF(0) moves toward the signal for space. In conclusion, in case that an input signal has high power, the reference voltage $V_{opt}$, which is a reference point in obtaining a minimum ratio of bit error when distinguishing between space and mark, must move toward the signal for space, as shown in FIG. 3. Information on various noises is described in the article "Lightwave Systems with Optical Amplifiers", introduced by N. A. Olsson IEEE J. Light Technol., vol. 7, No. 7, pp.1071–1081, 1989.

Conventional optical signal receiving apparatuses are, however, disadvantageous in that the reference voltage $V_{opt}$, which is used to regenerate data, is fixed irrespective of a change in the power of an optical signal, which makes it impossible to realize optical signal receiving apparatus having an optimum receiving performance regardless of a change in the power of an optical signal.

SUMMARY OF THE INVENTION

To solve the above and related problem, it is an object of the present invention to provide an optical signal receiving apparatus having an optimum receiving performance that is not affected by a change in the power of an input optical signal, the apparatus detecting a change in the power of an input optical signal and controlling a reference voltage for a limiting amplifier used in distinguishing between space and mark, according to the detected power, and a method using the apparatus.

To achieve one aspect of the above object, there is provided an optical signal receiving apparatus including an optical coupler for dividing an input optical signal at a predetermined ratio to produce first and second divided signals; a photoelectric converter for converting the first divided signal into an electric signal; an amplifier for amplifying the electric signal within a predetermined range centering on a reference voltage; a reference voltage controlling unit for detecting the power of the second divided signal, predicting the power of the first divided signal, and controlling the amplitude of the reference voltage in accordance with the predicted power; and a clock & data recovery unit for recovering a clock signal and data from a signal output from the amplifier.

To achieve another aspect of the above object, there is provided a method of receiving an optical signal, including (a) measuring the power of an input optical signal and producing a reference voltage corresponding to the measured power; (b) converting the input optical signal into an electric signal to produce the electric signal; (c) amplifying the electric signal to a value within a predetermined range centering on the reference voltage produced in (a); and (d) recovering a clock signal and data from the signal amplified in (c).

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
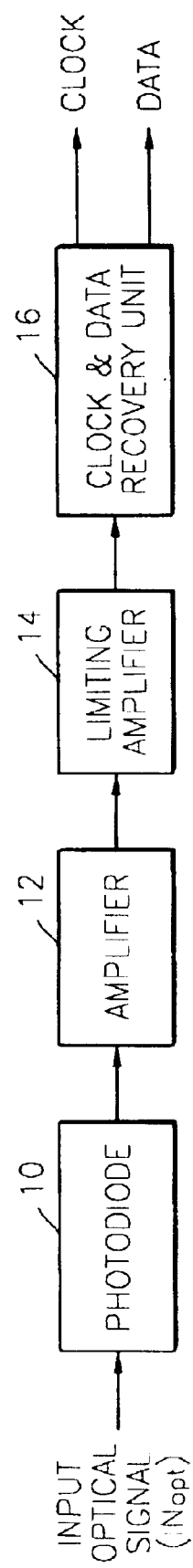
FIG. 1 is a block diagram schematically illustrating the structure of a conventional optical signal receiving apparatus.
Figure 2:
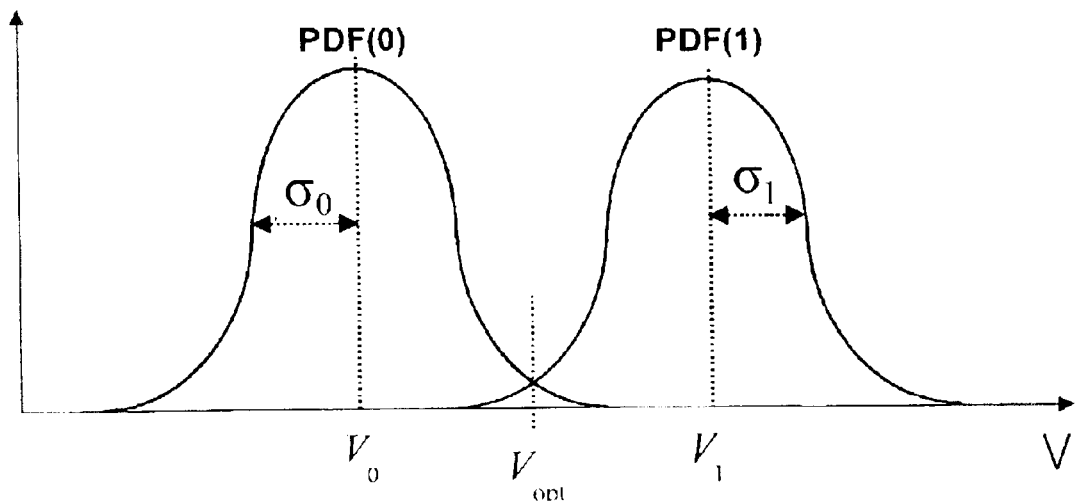
FIG. 2 is a graph illustrating stochastic distributions of an electric signal with respect to space and mark when an optical signal is converted into an electric signal.
Figure 3:
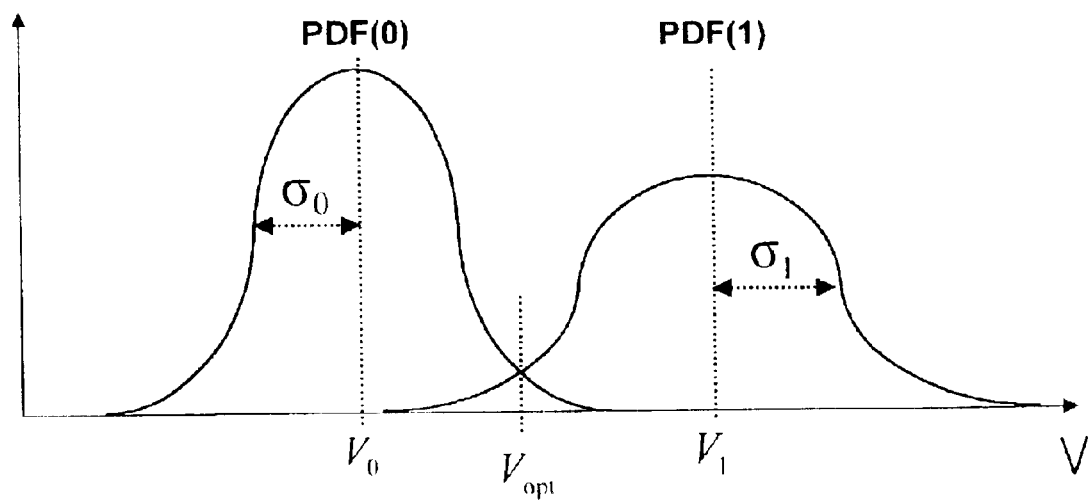
FIG. 3 is a graph illustrating stochastic distributions of a signal with respect to space and mark when bit noise increases due to an increase in the power of an input optical signal.
Figure 4:
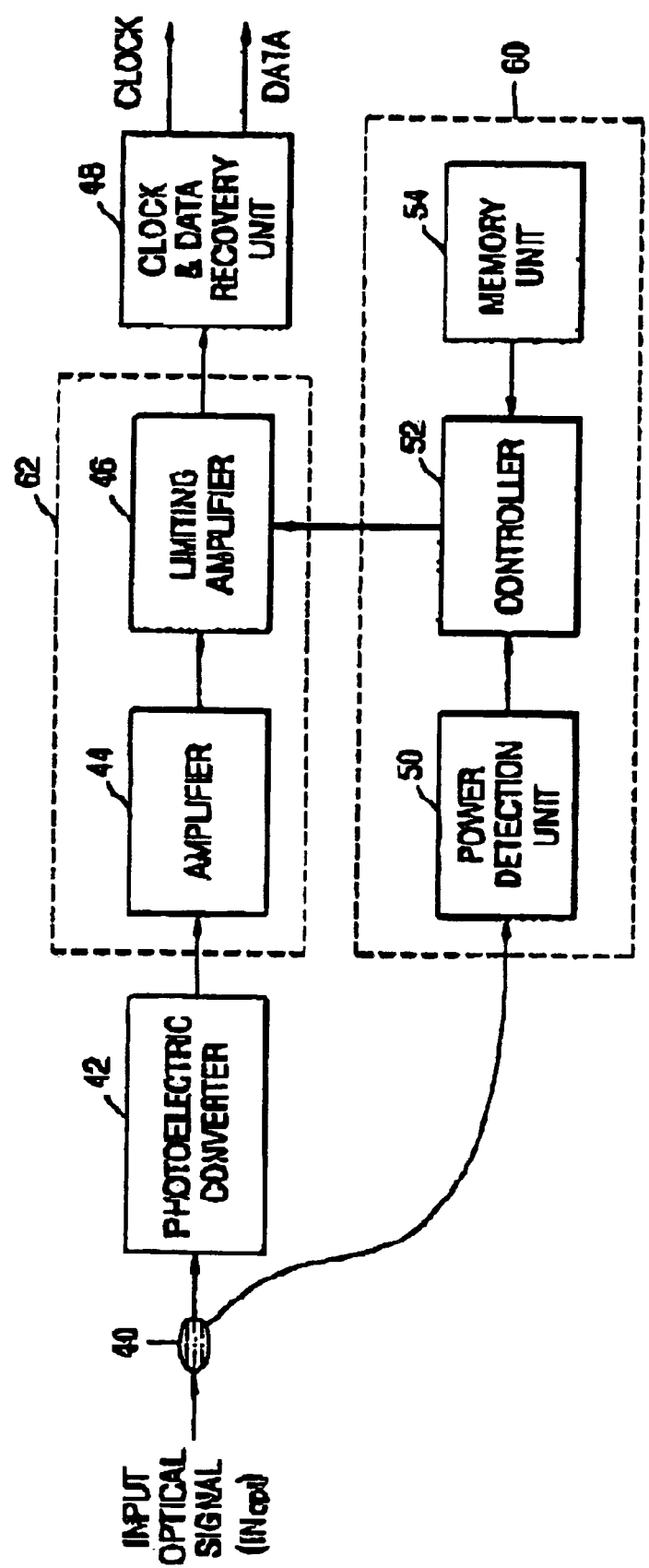
FIG. 4 is a block diagram schematically illustrating the structure of an optical signal receiving apparatus according to the present invention.

FIG. 4 is a block diagram schematically illustrating the structure an optical signal receiving apparatus according to the present invention. The apparatus includes an optical coupler 40, a photoelectric converter 42, an amplifying unit 62, a clock & data recovery unit 48, and a reference voltage controlling unit 60.

Referring to FIG. 4, the optical coupler 40 divides an input optical signal INopt at a predetermined ratio to generate first and second divided signals opt1 and opt2.

The photoelectric converter 42 converts the first divided signal opt1, which is divided by the optical coupler 40, into an electric signal.

The amplifying unit 62 amplifies the electric signal, which is converted from light by the photoelectric converter 42, to a value within a predetermined range centering on the reference voltage Vref controlled by the reference voltage controlling unit 60. Preferably, the amplifying unit 62 includes an amplifier 44 and a limiting amplifier 46. The converted electric signal is a very feeble signal and therefore is amplified by the amplifier 44. The limiting amplifier 46 amplifies the electric signal amplified by the amplifier 44 to a value within a predetermined range centering on the reference voltage Vref, so that a signal of a regular size is input to the clock & data recovery unit 48.

The reference voltage controlling unit 60 detects the power of the second divided signal opt2 to predict the power of the first divided signal opt1, and controls the amplitude of the reference voltage Vref according to the predicted optical power. Preferably, the reference voltage controlling unit 60 includes a optical power detection unit 50 and a controller 52. The optical power detection unit 50 receives the second divided signal opt2 from the optical coupler 40 detects the power of the second divided signal opt2, and predicts the power of the first divided signal opt1 corresponding to the detected power. For instance, if the dividing ratio of the first and second divided signals opt1 and opt2 are set at 9:1 by the optical coupler 40, it is possible to predict that the power of the first divided signal opt1 is nine times as strong as that of the second divided signal opt2. The controller 52 controls the amplitude of the reference voltage Vref in accordance with the power predicted by the power detection unit 50. As previously mentioned, an increase in the power of an input optical signal allows bit noise to predominate, which makes the noise level of mark larger than the noise level of space. When the mark noise and space noise of a signal, which is amplified by the limiting amplifier 46, are not the same, the clock & data recovery unit 46 may commit a bit discrimination error. The reference voltage controlling unit 60 control the reference voltage Vref in the limiting amplifier 44 to minimize the occurance of a bit discrimination error during a clock and data recovery process of the clock & data recovery unit 46, which will be later explained with reference to FIG. 5. The memory unit 54 memorizes the optimum reference voltage which is best suitable for optimum performance with respect to the power of the optical signal.

The clock & data recovery unit 48 recovers a clock signal and data from the signal of a regular size which is output from the limiting amplifier 44 of the amplifying unit 42.

More specifically, the controller 52 detects, from the memory unit, an optimum reference voltage corresponding to the power of the optical signal predicted by the power detection unit 50, and controls the amplifying unit 62 using the detected reference voltage.

In general, the wear of an optical device in an optical system results in a reduction in the power of laser diode or a gain unbalance of an optical amplifier. The gain unbalance would increase the power of one channel and decrease the power of another channel. Further, an optical fiber may be damaged and deteriorate the power of an optical signal, and as a result, the original power of an input optical signal may be changed. However, even if the power of an optical signal changes gradually, an optical signal receiving apparatus according to the present invention is capable of detecting and adjusting an optimum reference voltage for a limiting amplifier in accordance with the power of the optical signal. Therefore, the performance of the optical signal receiving apparatus can be maintained regardless of a change in an input optical signal.

Figure 5A:
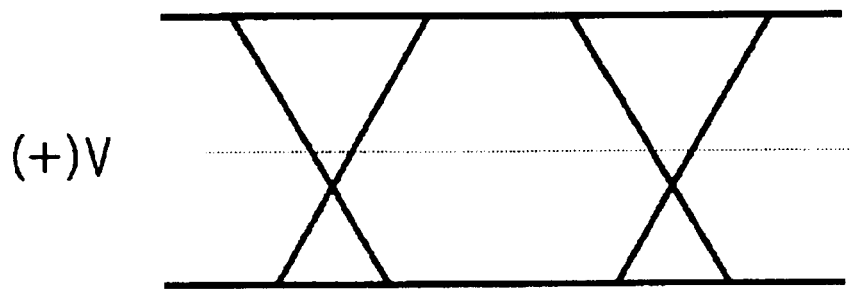
FIGS. 5A through 5C are diagrams of the operation of a limiting amplifier of the optical receiving apparatus of FIG. 4 with respect to a reference voltage.
Figure 5B:
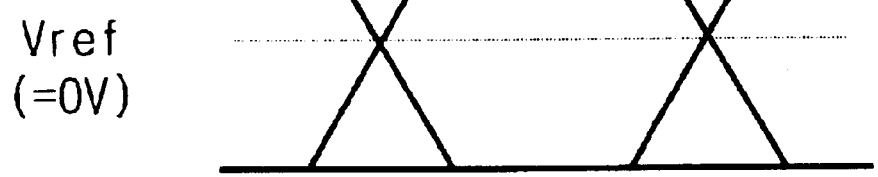
Figure 5C:
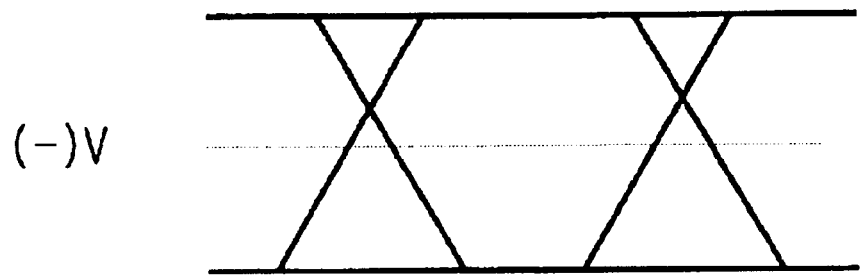

FIGS. 5A through 5C are diagrams illustrating the operation of the limiting amplifier 46 of FIG. 4 according to reference voltage Vref. For convenience, in the present invention, it is assumed that the reference voltage is 0 when noise at a level of mark and space in a signal, which is amplified by the limiting amplifier 46, have the same noise distribution. If the noise level of mark is larger than the noise level of space, the reference voltage controlling unit 60 makes the reference voltage Vref in the limiting amplifier 46 to be smaller than 0, i.e., to be negative (−), as shown in FIG. 5C, thereby lowering the reference voltage for data discrimination for the clock & data recovery unit 48. In contrast, if the noise level of mark is smaller than the noise level of space, the reference voltage controlling unit 60 makes the reference voltage Vref to be larger than 0V, i.e., to be positive (+), as shown in FIG. 5A, thereby increasing the reference voltage for data discrimination for the clock & data recovery unit 48.

Figure 6:
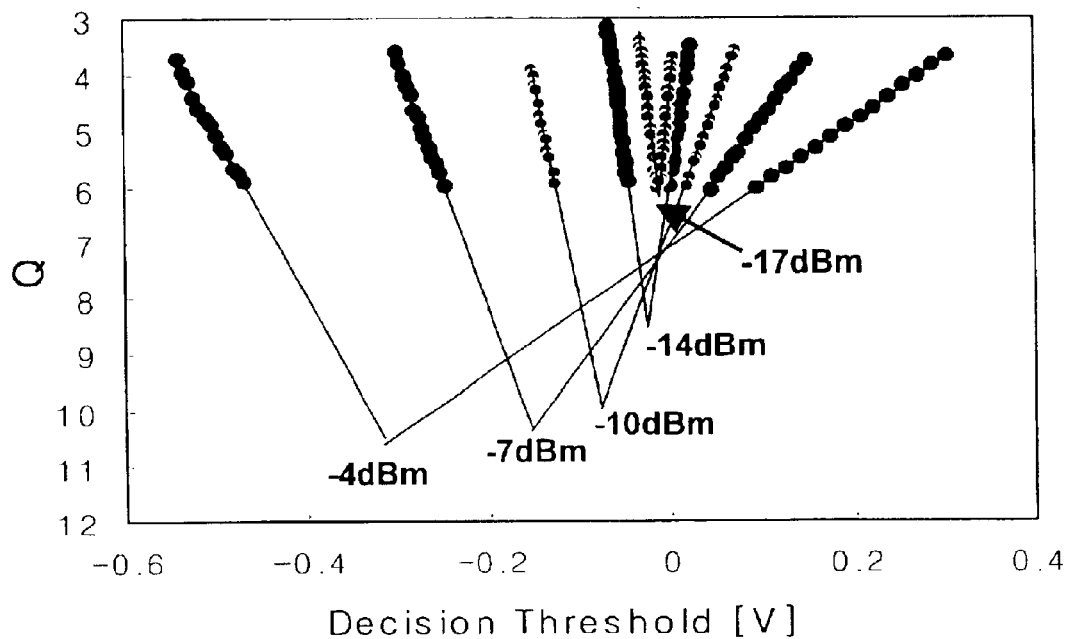
FIG. 6 is a graph illustrating a method of measuring the optimum transmission performance of an optical signal receiving apparatus, according to the present invention, using a V curve.

FIG. 6 is a graph illustrating a method of measuring the optimum transmission performance Q using a V curve. A method of measuring the receiving performance using a V curve is disclosed in the article "Margin Measurements in Optical Amplifier Systems", by N. S. Bergano, F. W. Kerfoot, and C. R. Davidson, IEEE Photon, Techno 1., Vol. 5, No. 3, pp. 304–306,1993.

Referring to FIG. 6, the X-axis indicates the reference voltage Vref of a limiting amplifier and the Y-axis indicates the transmission performance Q of an optical signal receiving apparatus. Here, the reference voltage Vref of the limiting amplifier is decided from a V curve made by fitting a straight line from a mark and a straight line from a space, and extending these lines. As shown in FIG. 6, as the power of an optical signal becomes larger from −17 dBm to −4 dBm, the apex of the V curve shifts toward the space signal. This is because the bit noise is proportional to the power of an optical signal. Referring to FIG. 6, the Y-axis value corresponding to the apex of the V curve, denotes a point where a bit discrimination error is minimized, i.e., the transmission performance Q is optimum. It is possible to obtain the optimum transmission performance Q in accordance with the power of each optical signal by adjusting the reference voltage of the limiting amplifier.

Figure 7:
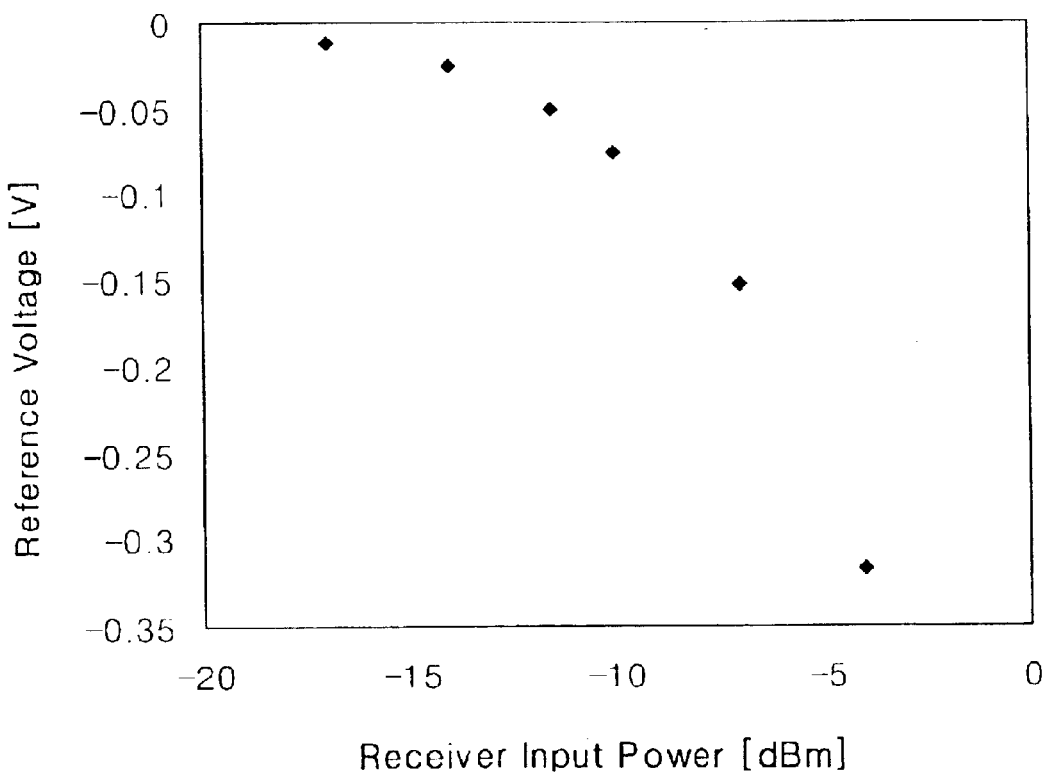
FIG. 7 is a graph illustrating the results of measuring an optimum reference voltage versus power of an optical signal.

FIG. 7 is a graph illustrating the optimum reference voltage for the power of each optical signal. Referring to FIG. 7, a method of setting reference voltage in the limiting amplifier 46 of the optical signal receiving apparatus of FIG. 4 will now be described. In general, if the power of an input optical signal is high, noise of mark increases due to bit noise, thereby reducing the reference voltage in the limiting amplifier 46. Meanwhile, the optimum reference voltage in the limiting amplifier 46 may depend on the components used and the conditions of a system. Thus, during the installation of an optical signal receiving apparatus into the system, the optimum reference voltage suitable for the power of an input optical signal may be detected as described above with reference to FIGS. 5 and 6, and then memorized in a memory unit as described with reference to FIG. 4. In this case, the controller 52 reads from the memory unit the reference voltage Vref corresponding to the input from the power detection unit 50 and sets the read reference voltage Vref as the reference voltage Vref in the limiting amplifier 46.

Figure 8:
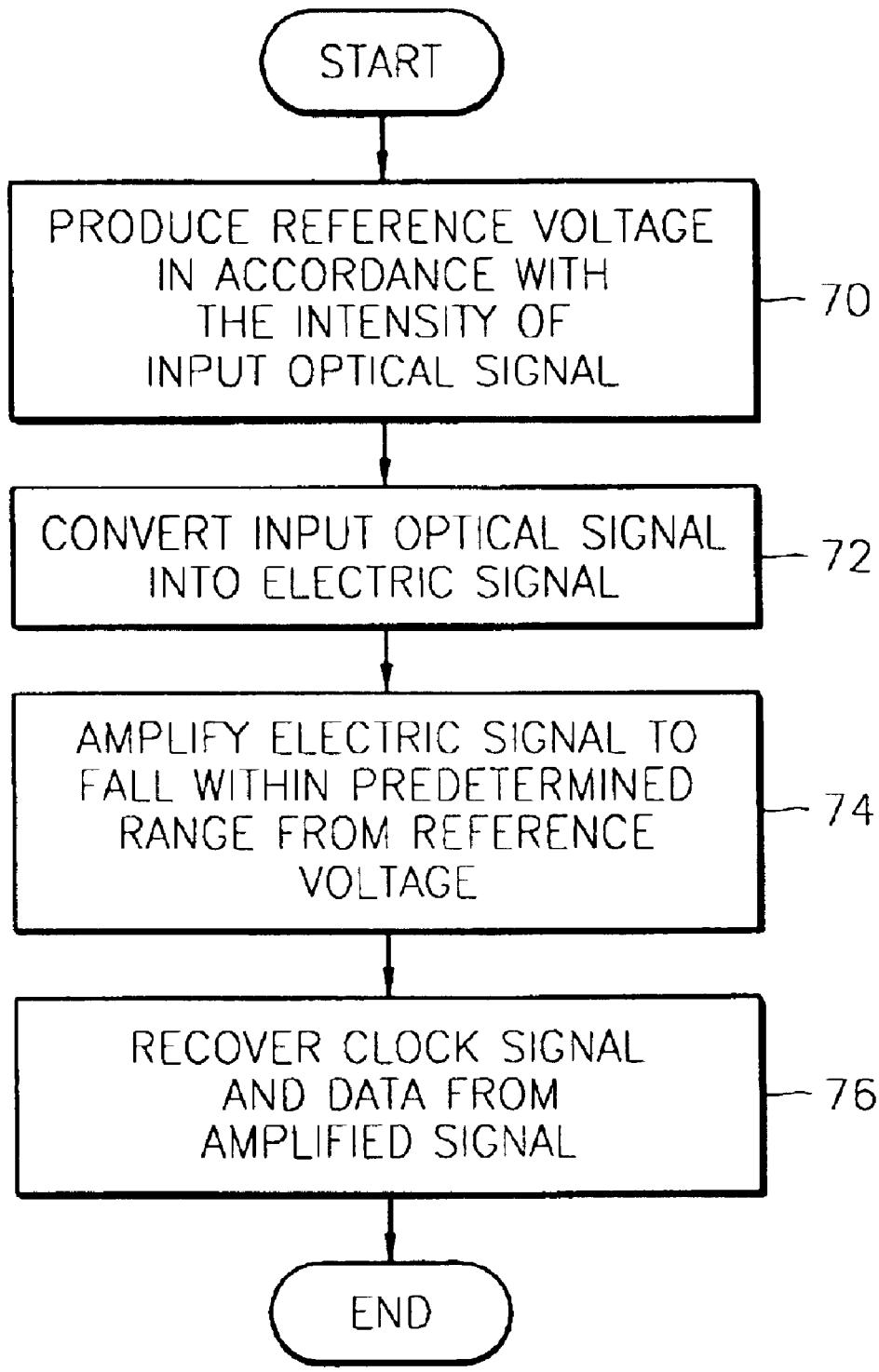
FIG. 8 is a flowchart illustrating a method of receiving an optical signal using the optical signal receiving apparatus of FIG. 4.

FIG. 8 is a flowchart illustrating a preferred embodiment of a method of receiving an optical signal with the optical signal receiving apparatus of FIG. 4.

Hereinafter, the operation of the optical signal receiving apparatus of FIG. 4 will be described with reference to FIGS. 4 and 8. First, the reference voltage controlling unit 60 measures the power of an input optical signal INopt and generates reference voltage in accordance with the measured power (step 70). After step 70, the photoelectric converter 42 converts the input optical signal INopt into an electric signal (step 72).

More specifically, the optical coupler 40 divided the input optical signal INopt at a predetermined ratio to produce a first divided signal opt1 and a second divided signal opt2. Next, the photoelectric converter 42 converts the first divided signal opt1 into an electric signal. Thereafter, the power detection unit 50 of the reference voltage controlling unit 60 measures the power of the second division signal opt2, which is divided by the optical coupler 40, and predicts the power of the first divided signal opt1 from the measured power of the second divided signal opt2. Then, the controller 52 produces the reference voltage Vref corresponding to the power predicted by the power detection unit 50, and controls the limiting amplifier 46 in accordance with the produced reference voltage Vref.

After step 72, the reference voltage in the limiting amplifier 46 is controlled by the controller 52 and the limiting amplifier 46 amplifies the electric signal, which is converted from the input optical signal and amplified, to a value within a predetermined range centering on the reference voltage (step 74). As described above, when noise is shifted to one of a mark level or a space level, the clock & data recovery unit 48 obtains an offset of adjusting the reference voltage, which is a basis for data discrimination, by the reference voltage controlled by the reference voltage controlling unit 60, thereby minimizing the occurrence of a bit discrimination error.

After step 74, the clock & data recovery unit 48 recovers a clock signal and data from the amplified signal (step 76).

The present invention can be embodied as a computer readable code that can be executed by a computer readable medium. Here, the computer readable medium may be any recording apparatus capable of storing data that can be read by a computer system, e.g., a read-only memory (ROM), a random access memory (RAM), a compact disc (CD)-ROM, a magnetic tape, a floppy disk, flash memory, an optical data storage device, and so on. Also, the computer readable medium may be a carrier wave that transmits data via the Internet, for example. The computer readable recording medium can be remremotely installed in a computer system connected to a network, and stores and executes a computer readable code by a distributed computing environment.

While this invention has been particularly shown and described with reference to preferred embodiments thereof, it will be understood by those skilled in the art that various changes in form and details may be made therein without departing from the spirit and scope of the invention as defined by the appended claims.

As described above, according to an apparatus and method for receiving an optical signal, even if the power of an optical signal changes, the reference voltage of a limiting amplifier, which is best suitable for optimum performance with respect to the power of an input optical signal, is detected and adjusted, thereby maintaining the optimum receiving performance of the optical signal receiving apparatus.

What is claimed is:

1. An optical signal receiving apparatus comprising:
   an optical distributor for distributing an input optical signal at a predetermined ratio to produce first and second distribution signals;
   a photoelectric converter for converting the first distribution signal into an electric signal;
   an amplifier for amplifying the electric signal within a predetermined rang centering on a reference voltage;
   a reference voltage controlling unit for detecting the intensity of the second distribution signal, predicting the intensity of the first distribution signal, and controlling the intensity of the reference voltage in accordance with the predicted intensity; and
   a data recovery unit for recovering data from the amplifier.

2. The apparatus of claim 1, wherein the reference voltage controlling unit comprises:
   a power detection unit for receiving the second divided signal, detecting the power of the second divided signal, and predicting the power of the first divided signal corresponding to the detected power; and
   a controller for controlling the amplitude of the reference voltage in accordance with the power predicted by the power detection unit.

3. The apparatus of claim 2, wherein the reference voltage controlling unit comprises a memory unit for memorizing the reference voltage which is best suitable for optimum performance with respect to the power of the first divided optical signal, and the controller reads the reference voltage corresponding to the predicted power of the first divided optical signal from the memory unit and controls the amplifying unit using the read reference voltage.

4. A method of receiving an optical signal, comprising:

(a) dividing an input optical signal at a predetermined ratio to produce first and second divided signals;

(b) converting the first divided signal into an electric signal;

(c) measuring the power of the second divided signal, predicting the power of the first divided signal based on the measured power, and producing the reference voltage in accordance with the predicted power; and (d) amplifying the electric signal within a predetermined range centering on the reference voltage; and (e) recovering data from the amplified electric signal.

* * * * *